(12) United States Patent
Labyre

(10) Patent No.: US 11,023,392 B2
(45) Date of Patent: Jun. 1, 2021

(54) METHOD FOR ARBITRATING ACCESS TO A SHARED MEMORY, AND CORRESPONDING ELECTRONIC DEVICE

(71) Applicant: STMicroelectronics (Grenoble 2) SAS, Grenoble (FR)

(72) Inventor: Jean-Louis Labyre, Sassenage (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 16/794,612

(22) Filed: Feb. 19, 2020

(65) Prior Publication Data

US 2020/0272584 A1    Aug. 27, 2020

(30) Foreign Application Priority Data

Feb. 21, 2019 (FR) ...................................... 1901746

(51) Int. Cl.
*G06F 13/16* (2006.01)
*G06F 13/362* (2006.01)
*G06F 13/42* (2006.01)

(52) U.S. Cl.
CPC ...... *G06F 13/1605* (2013.01); *G06F 13/1668* (2013.01); *G06F 13/3625* (2013.01); *G06F 13/423* (2013.01); *G06F 13/4282* (2013.01)

(58) Field of Classification Search
CPC ............. G06F 13/1605; G06F 13/1668; G06F 13/3625; G06F 13/423; G06F 13/4282
See application file for complete search history.

(56) References Cited

U.S. PATENT DOCUMENTS

| | | | | |
|---|---|---|---|---|
| 6,363,461 | B1 * | 3/2002 | Pawlowski | G06F 13/1605 711/154 |
| 6,704,822 | B1 * | 3/2004 | Tremblay | G06F 9/5016 710/240 |
| 6,880,028 | B2 * | 4/2005 | Kurth | G06F 13/3625 710/240 |
| 2006/0155893 | A1 | 7/2006 | Bottemiller et al. | |
| 2014/0229644 | A1 * | 8/2014 | Thanigasalam | G06F 13/1673 710/110 |

OTHER PUBLICATIONS

INPI Search Report and Written Opinion for FR 1901746 dated Jul. 26, 2019 (8 pages).
Philips Semiconductors: "The I2C Bus Specification Version 2.1," Internet Citation, 2000, pp. 1-46, Extract From Internet Jun. 19, 2012, URL : http://i2c2p.twibright.com:8080/spec/i2c.pdf, XP002678058.
"PCI Local Bus Specification—Revision 3.0—Bus Operation," PCI Local Bus Specification, No. Revision 3.0, Feb. 3, 2004, XP002497814, 101 pages.

* cited by examiner

*Primary Examiner* — Henry Tsai
*Assistant Examiner* — John B Roche
(74) *Attorney, Agent, or Firm* — Crowe & Dunlevy

(57) ABSTRACT

Access to a memory shared between a first interface and a second interface is arbitrated. Following a request to access the memory emanating from the second interface, while current access to the memory is granted to the first interface, a count is triggered having a maximum count time. A access to the memory is authorized for the second interface at the end of occupation of the access granted to the first interface if the end of occupation finishes before the end of the maximum count time, or otherwise at the end of the maximum count time.

23 Claims, 3 Drawing Sheets

METHOD FOR ARBITRATING ACCESS TO A SHARED MEMORY, AND CORRESPONDING ELECTRONIC DEVICE

PRIORITY CLAIM

This application claims the priority benefit of French Application for Patent No. 1901746, filed on Feb. 21, 2019, the content of which is hereby incorporated by reference in its entirety to the maximum extent allowable by law.

TECHNICAL FIELD

Modes of implementation and embodiments relate to electronic devices and, more particularly, relate to electronic devices for arbitrating access to a shared memory, also referred to as shared memory arbitration.

BACKGROUND

In general, an electronic device for arbitrating access to a shared memory is configured so as to grant access to the memory, which is assumed to be available, to an interface that is first to request the access.

In other words, when access to the memory is not currently occurring, the electronic device is configured so as to accept an access request delivered by any interface and first received by the electronic device.

Once access to the memory is granted, such an electronic device is configured so as to suspend or deny subsequent access requests delivered by a second interface, until the end of the access granted to the first interface.

When access to the memory has already been granted, a conventional approach for the second interface is that of periodically repeating its access request, known to those skilled in the art as a busy waiting process or a polling process, until access to the memory is available again.

However, when the access time to the memory granted to the first interface is long, this conventional approach generally becomes expensive in terms of time and energy consumption due to numerous repetitions of the access request by the second interface.

In addition, obtaining access to the memory by the second interface may not be automatically guaranteed at the end of occupation of the access to the memory granted to the first interface, since the electronic device may receive another access request from the first interface between the end of the access granted to the first interface and a subsequent repetition of the access request from the second interface.

If the access requests from the first interface are frequent and unpredictable, it is possible that the second interface will still be blocked and will remain in the busy waiting process or polling process.

In other words, there is generally a requirement for fine and accurate synchronization in order to obtain access to the memory after one or more busy waiting processes, and it may be impossible to interrupt access to the memory once granted; this can be problematic or even dangerous for the overall security of the electronic device since access to the memory may be permanently monopolized, entirely in bad faith, by a single interface in cases of computer hacking.

There is thus a need for a new development enabling low complexity and low energy consumption for avoiding access to the memory being permanently blocked and for efficiently managing alternate access to the memory.

SUMMARY

According to one aspect, what is proposed is a method for arbitrating access to a memory shared between at least a first interface and a second interface.

This method includes: triggering a count having a maximum count time, following a request to access the memory emanating from the second interface while current access to the memory is granted to the first interface, and authorizing access to the memory for the second interface at the end of occupation of the access granted to the first interface if the end of occupation finishes before the end of the maximum count time, or otherwise at the end of the maximum count time.

Advantageously, such a method makes it possible, when an access request from the second interface is received while occupation of the access to the memory has already been granted to the first interface, to help ensure alternation of the access to the memory at the end of a maximum count time or at the end of occupation of the current access if this end of occupation finishes earlier than the end of said maximum count time.

Access to the memory is therefore not able to be occupied exclusively once access has been granted to an interface. Alternation of access to the memory is guaranteed, at the latest, after expiration of a maximum count time.

It should be noted that such a method may advantageously be applied to each interface requesting access to the memory, or selectively to one or more interfaces so as to allow this interface or these interfaces to obtain access to the memory as a priority.

Moreover, it should be noted that triggering of the count following an access request may be understood to mean triggering the count upon the reception of the access request or else after a time interval after this reception.

According to one mode of implementation, the first interface is able to perform a write operation to the memory, this write operation having a time less than or equal to a maximum write time, and the maximum count time is chosen so as to be greater than the maximum write time.

This makes it possible to allow a write operation currently taking place to the memory to finish, thus advantageously avoiding corruption of the data written to memory.

According to one mode of implementation, the second interface includes a control signal able to toggle between two logic states.

It is then possible, for example, to perform a first toggling of the control signal following the access request emanating from the second interface, and the count is triggered upon the first toggling of the control signal.

This may, for example, be implemented in the context of an I²C bus.

By way of indication but without limitation, it is possible, for example, to perform a second toggling of the control signal at the end of occupation of the access granted to the first interface if the end of occupation finishes before the end of the maximum count time, or otherwise at the end of the maximum count time, and access to the memory is authorized for the second interface following the second toggling of the control signal.

In this case too, this may advantageously be implemented in the context of an I²C bus.

According to one mode of implementation, the first interface may be a near-field communication or radiofrequency identification radiofrequency communication interface, and the second interface may be an I²C or SMBus bidirectional synchronous serial bus.

Such a method advantageously makes it possible to grant the I²C or SMBus interface access to the memory, in the worst-case scenario, at the end of the maximum count time.

By way of non-limiting example, in the case for example of an I²C interface, the control signal of the second interface is a serial clock line (SCL) signal.

This control signal is advantageously used here to inform control circuitry, for example a microcontroller, coupled to the I²C or SMBus interface, that access to the memory is currently unavailable to meet its request to access the memory via the I²C or SMBus interface.

According to yet another mode of implementation, the maximum count time is chosen to be between 25 ms and 35 ms if the second interface is an SMBus bidirectional synchronous serial bus, this being compatible with the SMBus standards.

For example, in the case of a second I²C or SMBus interface, the access request emanating from the second interface may, for example, contain at least one byte and the first toggling takes place following the first byte of the access request from the second interface, and the control signal of the second interface is in a low state following the first toggling and in a high state following the second toggling, which may be referred to using the term SCL stretch.

The low state of the control signal indicates that the second interface is not ready to process a request to access the memory, whereas the high state of the control signal indicates that the second interface is again ready to process a request to access the memory.

According to another aspect, what is proposed is an electronic device including at least a first interface and a second interface, a memory configured to be shared between the at least first and second interfaces, and arbitration circuitry configured to: trigger a count having a maximum count time following a request to access the memory emanating from the second interface while current access to the memory is granted to the first interface, and authorize access to the memory for the second interface at the end of occupation of the access granted to the first interface if the end of occupation finishes before the end of the maximum count time, or otherwise at the end of the maximum count time.

By way of indication but without limitation, the first interface is able to perform a write operation to the memory, this write operation having a time less than or equal to a maximum write time, and the maximum count time is advantageously chosen so as to be greater than the maximum write time.

According to one embodiment, the second interface includes a control signal able to toggle between two logic states, and the arbitration circuitry is configured so as to perform first toggling of the control signal following the access request emanating from the second interface, and trigger the count upon the first toggling of the control signal.

The arbitration circuitry may, for example, be configured to: perform second toggling of the control signal at the end of occupation of the access granted to the first interface if the end of occupation finishes before the end of the maximum count time, or otherwise at the end of the maximum count time, and authorize access to the memory for the second interface following the second toggling of the control signal.

According to one embodiment, the first interface may be a near-field communication or radiofrequency identification radiofrequency communication interface, and the second interface may be an I²C or SMBus bidirectional synchronous serial bus.

The control signal of the second interface may be, for example, a serial clock line signal.

According to yet another embodiment, the maximum count time is chosen to be between 25 ms and 35 ms if the second interface is an SMBus bidirectional synchronous serial bus.

The access request emanating from the second interface may, for example, contain at least one byte and the arbitration circuitry may, for example, be configured so as to perform the first toggling following the first byte of the access request from the second interface, and draw the control signal of the second interface in a low state following the first toggling and in a high state following the second toggling.

According to another aspect, what is proposed is an electronic apparatus including an electronic device such as defined above and control circuitry coupled to the electronic device.

By way of indication but without limitation, the control circuitry may, for example, include a microcontroller.

According to another aspect, what is proposed is a communication system including an electronic apparatus such as defined above and wireless communication circuitry coupled to the electronic device.

According to one embodiment, the communication circuitry includes a near-field communication (NFC) or radiofrequency identification (RFID) reader.

BRIEF DESCRIPTION OF THE DRAWINGS

Other advantages and features will become apparent on examining the detailed description of completely non-limiting modes of implementation and embodiments and the appended drawings, in which.

DETAILED DESCRIPTION

Figure 1:
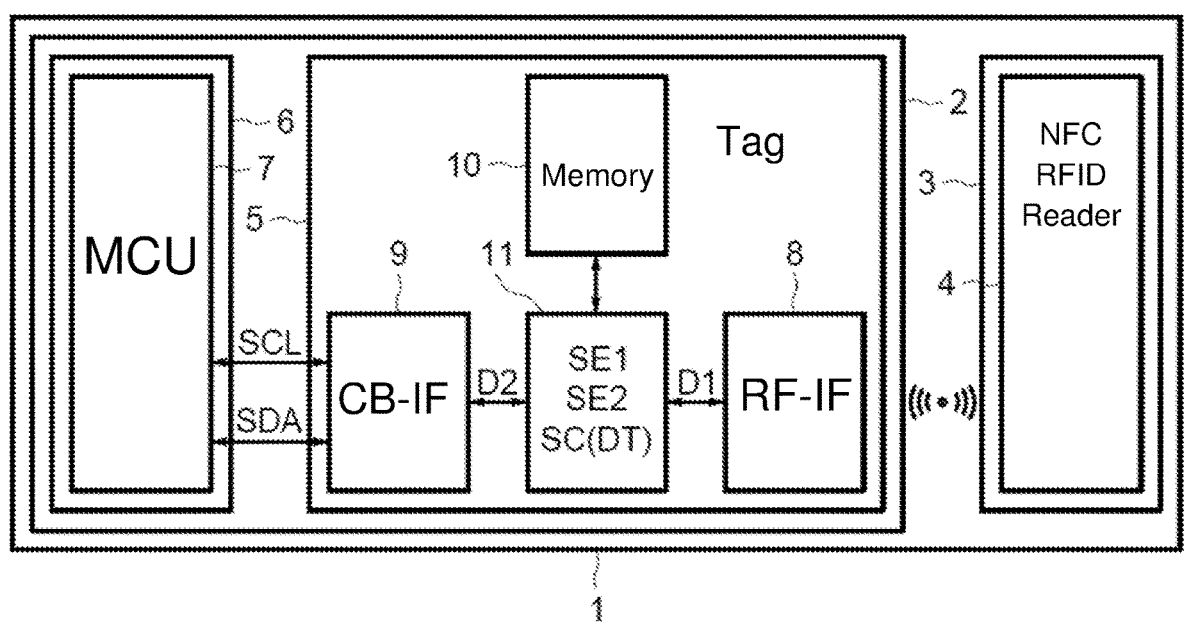
FIG. 1 schematically illustrates a communication system.

FIG. 1 illustrates a communication system 1, here for example a short-range wireless communication system based on near-field communication (NFC) or radiofrequency identification (RFID) technology, able to be implemented in industrial or domestic applications such as construction-site or residential access control systems.

The communication system 1 includes an electronic control apparatus 2 and communication circuitry 3.

The communication circuitry 3 may, for example, include a plurality of NFC or RFID readers. For the sake of simplification, a single NFC/RFID reader 4 is illustrated in FIG. 1.

The electronic control apparatus 2 includes an electronic device 5, here for example an electronic tag compatible with NFC or RFID technology, and control circuitry 6 including a microcontroller (MCU) 7.

The tag 5 includes: at least two interfaces, here for example a first interface (RF-IF) 8 including a radiofrequency communication interface configured so as to communicate wirelessly with the NFC/RFID reader 4 and a second computer bus interface (CB-IF) 9, a memory 10 configured to be shared between the at least first and second interfaces 8, 9, and arbitration circuitry 11 coupled respectively to the memory 10 and to the at least first and second interfaces.

The second interface 9 comprises an I²C (inter-integrated circuit) or SMBus (system management bus) bidirectional synchronous serial bus.

The second interface 9 is configured so as to communicate with the microcontroller 7 by way of a clock signal SCL and of a data signal SDA defined in the I²C and SMBus standards.

The microcontroller 7 operates as master on the I²C bus (I²C master), whereas the second interface 9 operates as slave on the I²C bus (I²C slave).

The arbitration circuitry 11 may, for example, be implemented in the form of a digital control unit including logic circuits and is configured so as to arbitrate access to the memory 10 between the first and second interfaces 8, 9.

According to one practical example, an access request emanating from the first interface 8 is unpredictable, since this depends on the presence or lack thereof of the NFC/RFID reader 4.

In this case, to give priority to the access requests from the second interface and to avoid possible blocking of access to the memory 10 resulting from computer hacking via the first interface 8, an access request from the second interface 9 is processed such that access thereof to the memory is guaranteed at the latest after expiration of a chosen time.

Figure 2:
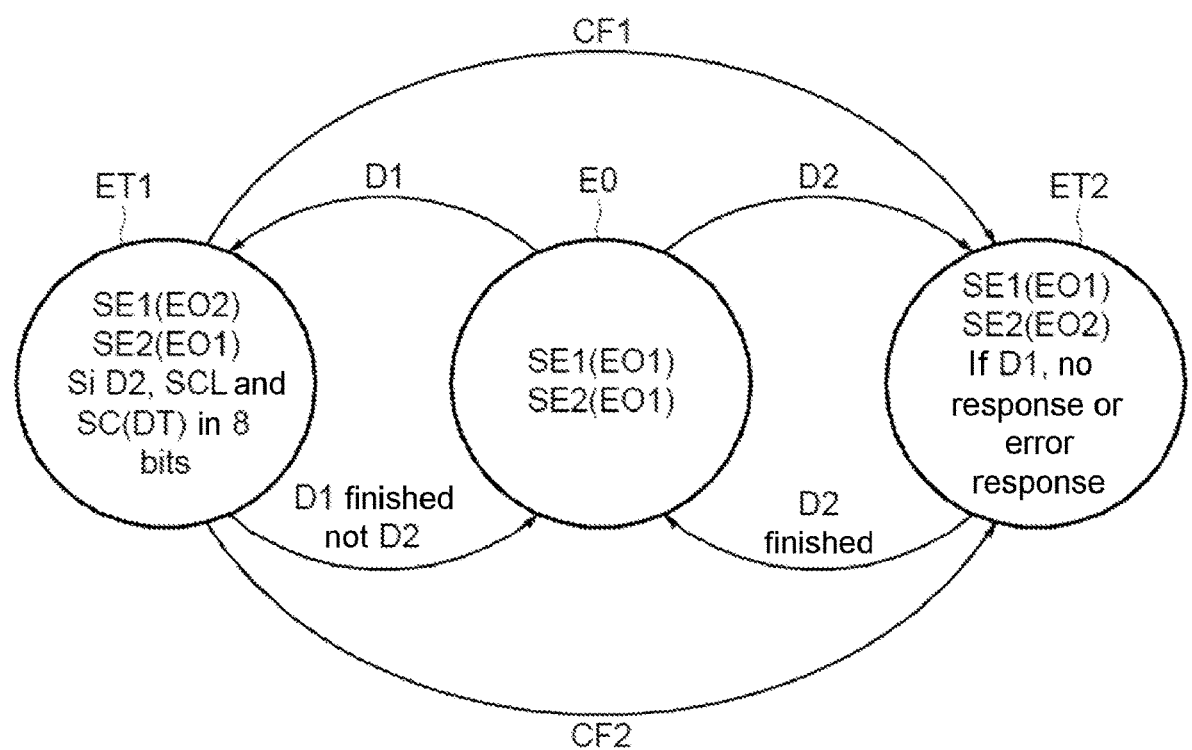
FIG. 2 schematically illustrates, in the form of state machine diagrams, one exemplary implementation of the arbitration circuitry.

Reference is now made to FIG. 2 in order to illustrate, in the form of state machine diagrams, one exemplary implementation of the arbitration circuitry 11.

Initially, the arbitration circuitry is in a standby state E0, and access to the memory is not granted. There is a first state signal SE1 representative of the state of occupation of the first interface 8 and a second state signal SE2 representative of the state of occupation of the second interface 9.

The first and second state signals SE1, SE2 are both in a first state of occupation EO1, this indicating that the memory 10 is not currently being accessed via either of the first and second interfaces 8, 9.

Furthermore, in this standby state E0, the arbitration circuitry 11 is configured so as to be ready to authorize any access request that is received first by the arbitration circuitry 11.

For example, if a first access request D1 emanating from the first interface 8 is received first, the arbitration circuitry 11 is configured so as to toggle the standby state E0 to a first processing state ET1.

In the same way, if a second access request D2 emanating from the second interface 9 is received first, the arbitration circuitry 11 is configured so as to toggle the standby state E0 to a second processing state ET2.

Once it has toggled to the first processing state ET1, the first state signal SE1 is toggled to a second state of occupation E02, this indicating that the memory 10 is currently being accessed via the first interface 8.

If the arbitration circuitry 11 does not receive an access request from the second interface 9 before the end of occupation of the access granted to the first interface 8, the arbitration circuitry 11 is configured so as to toggle the first processing state ET1 to the standby state E0.

If a second access request D2 emanating from the second interface 9 is received by the arbitration circuitry 11 during the first processing state ET1, the arbitration circuitry 11 is further configured so as to toggle a control signal, here the clock signal SCL defined in the I2C or SMBus standards.

More precisely, the arbitration circuitry 11 is configured so as to toggle the clock signal SCL to a low state following the first byte of the second request D2.

This toggling of the clock signal SCL is denoted using the term SCL stretch, and is configured to inform the master on the I²C bus, in other words the microcontroller 7, that the slave on the I²C bus, here the second interface 9, is not currently available to submit the second access request D2.

The transmission of the second access request D2 is therefore suspended by the microcontroller 7.

A count signal SC is activated for a timeout period DT, in other words a maximum count time, when the clock signal SCL toggles.

If the first interface 8 has made a request to access the memory in order to perform a write operation to the memory, depending in particular on the data to be written, the write time to the memory may be more or less long.

It is, however, possible to determine a maximum possible write time. The timeout period DT is then chosen so as to be greater than the maximum write time, for example of the order of 20 ms, thereby advantageously making it possible to avoid any corruption of the data written to memory.

If the second interface 9 is an SMBus bidirectional synchronous serial bus, this timeout period DT may be for example chosen to be between 25 ms and 35 ms in accordance with the SMBus standards.

There are two cases CF1, CF2 for toggling the first processing state ET1 to the second processing state ET2.

In a first case CF1, if the end of occupation of the access granted to the first interface 8 finishes before the end of the timeout period DT, the arbitration circuitry 11 is configured so as to toggle the first processing state ET1 to the second processing state ET2 following the end of occupation of the access granted to the first interface 8.

In a second case CF2, if the end of occupation finishes at the time of or after the timeout period DT, the arbitration circuitry 11 is configured so as to interrupt the access to the memory granted to the first interface 8 and grant it to the second interface 9.

In other words, these two cases CF1, CF2 are put in place in order to give priority to the second interface 9, here the I2C or SMBus interface, so as to ensure that access to the memory is obtained at the end of occupation of the access granted to the first interface 8 or, in the worst-case scenario, at the end of the timeout period DT.

On the other hand, during the second processing state ET2, the arbitration circuitry 11 is, for example, configured so as not to respond, or to respond with an error, to any access request from the first interface 8.

At the end of occupation of the access granted to the second interface 9, the arbitration circuitry 11 is configured so as to toggle the second processing state ET2 to the standby state E0.

Figure 3:
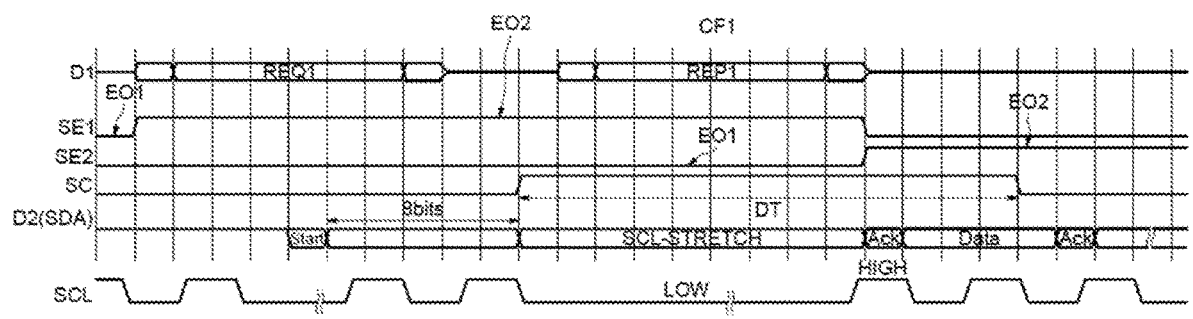
FIG. 3 illustrates a timing diagram.

Reference is now made to FIG. 3 in order to illustrate one exemplary implementation of the first case CF1 in the form of a timing diagram.

As is able to be observed in the upper part of FIG. 3, the first access request D1 from the first interface 8 is received first and triggers the second state of occupation E02, reflected here in a high state of the first state signal SE1, which indicates that the occupation of the access to the memory is granted to the first interface 8.

During the period of occupation of the access granted to the first interface 8, it is able to be observed that the first request D1 has delivered a request REQ1 and received a response REP1.

The second access request D2 from the second interface, here the data signal SDA, is illustrated at the bottom of FIG. 3 and is received by the arbitration circuitry 11 during the first access request D1.

The clock signal SCL is toggled to a low state LOW following the first byte (that is to say 8 first bits following a start control event and including device select bits) of the second request D2.

As explained above, this advantageously involves stretching the signal SCL (SCL stretch) in accordance with the I²C or SMBus standards in order to inform the microcontroller 7 that the second interface 9 is not available to receive data of the second request D2.

At the same time, the count signal SC is activated and toggled to a high state during the timeout period DT.

As is able to be seen in this first case CF1, the first state signal SE1, the second state signal SE2 and the clock signal SCL are respectively toggled to the first state of occupation EO1, the second state of occupation EO2, and the high state HIGH at the end of occupation of the access granted to the first interface 8.

A confirmation bit ACK (acknowledgement) is generated once the clock signal SCL enters the high state HIGH and data DATA are then delivered, following the confirmation bit ACK, by the microcontroller 7 in the case of a write operation or by the tag 5 in the case of a read operation.

The second interface 9 has therefore obtained access to the memory 10 at the end of occupation of the access granted to the first interface 8 without additional waiting.

Figure 4:
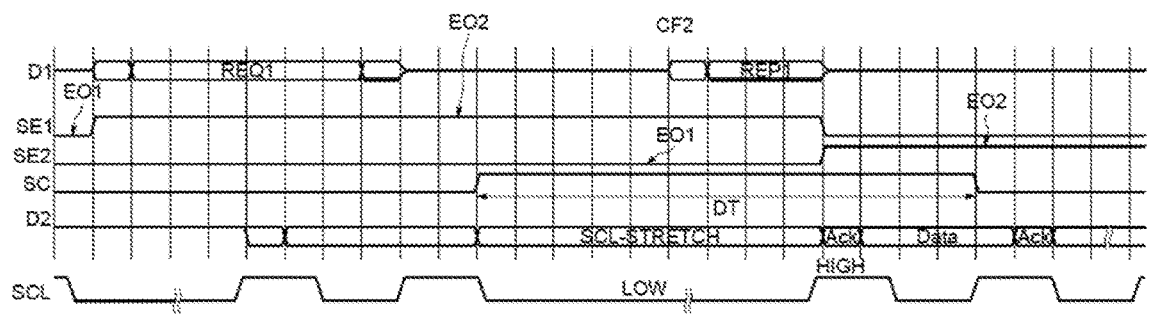
FIG. 4 illustrates a timing diagram.

FIG. 4 illustrates one exemplary implementation of the second case CF2 in the form of a timing diagram.

Unlike the first case CF1, the first request D1 from the first interface 8 in this second case CF2 has not yet finished at the time when the timeout DT ends.

In this circumstance, the arbitration circuitry 11 is configured so as to toggle the clock signal SCL to the high state HIGH if the count signal is again in the low state.

Therefore, the first and second state signals SE1, SE2 are respectively toggled to the first state of occupation EO1 and the second state of occupation EO2.

The transaction of the first request D1 from the first interface 8 is interrupted, and access to the memory 10 is now granted to the second interface 9.

It should be noted that the method for arbitrating access to the memory 5 illustrated above may, for example, be applied reciprocally to any pair of interfaces of the electronic device, and that the designations of the first and second interfaces may be exchanged.

A method and an electronic device for arbitrating access to a shared memory are thus obtained, making it possible to grant access to the memory to one or more priority interfaces, in the worst-case scenario, after expiration of a maximum count time, so as to avoid access to the memory being blocked and help ensure the overall security of the electronic device.

The invention claimed is:

1. A method for arbitrating access to a memory shared between a first interface and a second interface, comprising:
   triggering a count having a maximum count time in response to a request to access the memory emanating from the second interface while current access to the memory is granted to the first interface;
   authorizing access to the memory for the second interface at an end of the access granted to the first interface if the end of that access finishes before an end of the maximum count time; and
   authorizing access to the memory for the second interface at the end of the maximum count time if the end of the access granted to the first interface does not occur before the end of the maximum count time.

2. The method according to claim 1, wherein the first interface is configured to perform a write operation to said memory, said write operation having a time less than or equal to a maximum write time; and wherein the maximum count time is greater than said maximum write time of the write operation.

3. The method according to claim 1, wherein the second interface includes a control signal that toggles between two logic states, further comprising:
   performing a toggling of the control signal into a first state following the access request emanating from the second interface; and
   triggering the count in response to said toggling of the control signal into the first state.

4. The method according to claim 3:
   wherein toggling of the control signal into a second state is performed at the end of the access granted to the first interface if the end of that access finishes before the end of the maximum count time;
   wherein toggling of the control signal into a second state is performed at the end of said maximum count time if the end of the access granted to the first interface does not occur before the end of the maximum count time; and
   wherein access to the memory is authorized for the second interface following the toggling of the control signal into the second state.

5. The method according to claim 1, wherein the first interface comprises one of a near-field communication or a radiofrequency identification radiofrequency communication interface, and the second interface comprises an I2C or SMBus bidirectional synchronous serial bus.

6. The method according to claim 4, wherein the first interface comprises one of a near-field communication or a radiofrequency identification radiofrequency communication interface, and the second interface comprises an I²C or SMBus bidirectional synchronous serial bus; and wherein said control signal of the second interface is a serial clock line signal.

7. The method according to claim 6, wherein the maximum count time is between 25 ms and 35 ms if the second interface is an SMBus bidirectional synchronous serial bus.

8. The method according to claim 7, wherein the access request emanating from the second interface contains at least one byte and the toggling of the control signal into the first state takes place following a first byte of the access request from the second interface, and the control signal of the second interface is in a low state following the toggling of the control signal into the first state and in a high state following the toggling of the control signal into the second state.

9. A device, comprising:
   a first interface and a second interface;
   a memory configured to be shared between least first and second interfaces; and
   arbitration circuitry configured to:
      trigger a count having a maximum count time following a request to access the memory emanating from the second interface while current access to the memory is granted to the first interface;
      authorize access to the memory for the second interface at an end of the access granted to the first interface if the end of that access occurs before an end of the maximum count time; and authorize access to the memory for the second interface at the end of said maximum count time if the end of the access granted to the first interface does not occur before the end of the maximum count time.

10. The device according to claim 9, wherein the first interface is configured to perform a write operation to said memory, said write operation having a time less than or equal to a maximum write time; and wherein the maximum count time is greater than said maximum write time.

11. The device according to claim 9, wherein the second interface includes a control signal that toggles between first and second logic states, and wherein the arbitration circuitry is configured to:

toggle of the control signal into the first logic state following said access request emanating from the second interface; and trigger the count upon said toggling of the control signal into the first logic state.

12. The device according to claim 11, wherein the arbitration circuitry is configured to:

toggle the control signal into the second logic state at the end of the access granted to the first interface if the end of that access occurs before the end of the maximum count time;

toggle the control signal into the second logic state at the end of said maximum count time if the end of the access granted to the first interface does not occur before the end of the maximum count time; and authorize access to the memory for the second interface following the toggling of the control signal into the second logic state.

13. The device according to claim 9, wherein the first interface comprises one of a near-field communication or a radiofrequency identification radiofrequency communication interface, and the second interface comprises an I²C or SMBus bidirectional synchronous serial bus.

14. The device according to claim 12, wherein said control signal of the second interface is a serial clock line signal.

15. The device according to claim 14, wherein the maximum count time is between 25 ms and 35 ms if the second interface is an SMBus bidirectional synchronous serial bus.

16. The device according to claim 15, wherein the access request emanating from the second interface contains at least one byte and the arbitration circuitry is configured to perform the toggling of the control signal into the first logic state following a first byte of the access request from the second interface, and to draw the control signal of the second interface into a low state following the toggling of the control signal into the first logic state and in a high state following the toggling of the control signal into the second logic state.

17. An electronic apparatus, comprising an electronic device according to claim 9 and control circuitry coupled to the electronic device.

18. The electronic apparatus according to claim 17, wherein the control circuitry includes a microcontroller.

19. A communication system including an electronic apparatus according to claim 17, and wireless communication circuitry coupled to the electronic device.

20. The communications system according to claim 19, wherein the wireless communication circuitry includes a near-field communication or radiofrequency identification reader.

21. A method for arbitrating access to a memory shared between a first interface and a second interface, the method comprising:

sending a request to access the memory from the second interface, while access to the memory is currently granted to the first interface;

beginning to count in response to the request to access the memory sent by the second interface; and authorizing access to the memory for the second interface if an end of the access to the memory granted to the first memory access does not occur before a threshold value of the count.

22. The method according to claim 21, wherein the first interface is configured to perform a write operation to the memory, said write operation having a time less than or equal to a maximum write time; and wherein the threshold value of the count is greater than the maximum write time of the write operation.

23. The method according to claim 21, wherein the first interface comprises a near-field communication or radiofrequency identification radiofrequency communication interface, and the second interface comprises an I²C or SMBus bidirectional synchronous serial bus.

* * * * *